(12) United States Patent
Cooks

(10) Patent No.: US 9,999,205 B1
(45) Date of Patent: Jun. 19, 2018

(54) METHOD CREATING A PICTURE OR LOGO ON THE BOTTOM OF AN AQUARIUM

(71) Applicant: Keith Cooks, Fremont, OH (US)

(72) Inventor: Keith Cooks, Fremont, OH (US)

( * ) Notice: Subject to any disclaimer, the term of this patent is extended or adjusted under 35 U.S.C. 154(b) by 0 days. days.

(21) Appl. No.: 15/145,299

(22) Filed: May 3, 2016

Related U.S. Application Data

(63) Continuation-in-part of application No. 14/159,943, filed on Jan. 21, 2014.

(60) Provisional application No. 61/755,089, filed on Jan. 22, 2013.

(51) Int. Cl.
*A01K 63/00* (2017.01)
*A01K 63/06* (2006.01)
*B33Y 80/00* (2015.01)

(52) U.S. Cl.
CPC ............ *A01K 63/006* (2013.01); *A01K 63/06* (2013.01); *B33Y 80/00* (2014.12)

(58) Field of Classification Search
CPC .............................. A47G 9/025; A01K 63/006
USPC ............................................. 156/63; 220/575
See application file for complete search history.

(56) References Cited

U.S. PATENT DOCUMENTS

| 3,563,204 A * | 2/1971 | Szilagyi | A01K 63/06 119/267 |
| 3,908,598 A * | 9/1975 | Jewson | A01K 63/006 119/267 |
| 5,597,228 A * | 1/1997 | Boyle | A01K 63/06 119/267 |
| 8,113,147 B1 * | 2/2012 | Wang | A01K 63/06 119/267 |
| 2014/0131364 A1 * | 5/2014 | Miller | A47G 23/06 220/575 |

OTHER PUBLICATIONS https://web.archive.org/web/20100418110502/http://www.instructables.com/id/Aquarium-Coffee-Table/, "Instructables," captured Apr. 18, 2010.*

* cited by examiner

*Primary Examiner* — Philip C Tucker
*Assistant Examiner* — John Blades
(74) *Attorney, Agent, or Firm* — Jerry Semer

(57) ABSTRACT

The invention is a kit to produce a logo or picture on the bottom of an aquarium through the use of color stones. The method begins by creating or finding the picture. Next one converts the picture into areas. Each area has only one distinct color. The third step is to form an outline that encloses each of the areas. The next step is to transfer the outline from the logo to the surface. This surface can be the bottom of an aquarium or a separate surface. The fifth step is to form partitions on the outline on the surface. The partitions must be sufficiently deep to hold a least one layer of stones or sand. The last step is to place colored stones or colored sand within the partitions.

12 Claims, 6 Drawing Sheets

METHOD CREATING A PICTURE OR LOGO ON THE BOTTOM OF AN AQUARIUM

FIELD OF INVENTION

This invention relates to the field of forming pictures with colored stones or sand on the bottom of an aquarium, and more particularly to the forming of logos and advertising on the bottom of an aquarium using partitions to separates colored stones or sand.

BACKGROUND OF THE INVENTION

Colored stones have been used in the bottoms of aquariums a long time. The stones are usually poured out in larger volumes to cover an area. In the bottom of an aquarium the stones are usually laid out to form a sea scape that similar to an ocean or lake bottom. These seascapes are usually decorated with plants and sculptures of sunken ships, anchors, or other object one finds at the bottom of the sea. Applicant objective is to do something entirely different. He plans to form a picture on the bottom of an aquarium with colored stones.

Many individuals today like to use in their decorating of their office or living space the symbols of the university they graduated from or sports teams they follow. An objective of this invention is to help individuals to fulfill this endeavor by creating loges formed by small colored stones or colored sand of the individual's favorite team or character on the bottom of an aquarium.

The invention is a method for forming in an economical way artwork created by small colored stones or colored sand on the bottom of an aquarium. One of the objectives of the invention is to be able to create a logo or picture using small colored stones or colored sand economically. Applicant has not only created a method to produce the art work economically but also his method could individualize each piece economically. The feature that enables the inventor to create his pieces of art economically is that he takes the picture and creates solid areas of color. He then places partitions around these solid areas of color. This enables him to place small colored rocks or colored sand in these areas economically.

The use of partition enables the inventor to produce the invention economy for both mass production and individual production. For mass production the inventor can mold the partitions directly into the bottom of the aquarium or on a sheet that could be placed on the bottom of the aquarium. The bottom of the aquarium or the sheet could be molded by injection mold or vacuum formed. This would make a large volume very cheap.

The inventor could also make single production or individualized aquariums inexpensively. For this the inventor would use a 3-D printing machine to form the partitions. Thus he could individualize each picture by just changing software. The inventor's automated method allows creations to economically be produce in a large productions or individualize single runs.

SUMMARY OF THE INVENTION

The invention is a kit and method to produce a logo, picture or work of art on the bottom of an aquarium through the use of color stones. The method begins by creating or finding the desired picture. Next one converts the picture into areas. Each area has only one distinct color. The third step is to form an outline that encloses each of the areas of distinct color. The outline must fully enclose each color. Then one finds a surface. This surface can be the bottom of an aquarium or a separate surface. The next step is to transfer the outline from the picture or logo to the surface. The fifth step is to form partitions on the outline on the surface. These partitions could be colored or clear. The partitions must be sufficiently deep to hold a least one layer of stones or sand. The last step is to place colored stones or colored sand within the partitions.

DETAILED DESCRIPTION OF THE PREFERRED EMBODIMENT

Figure 1:
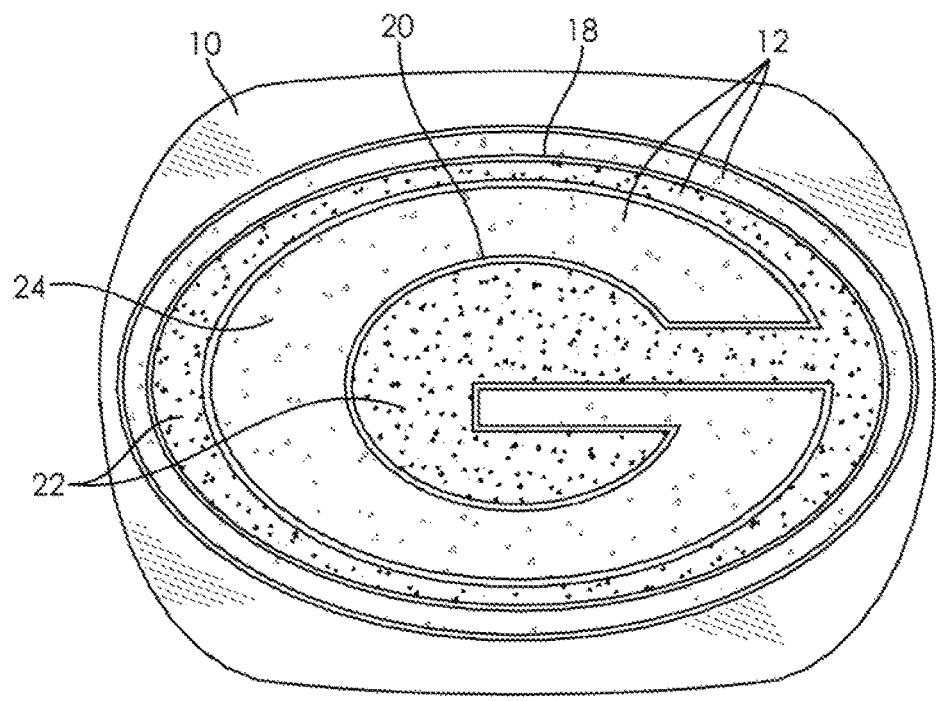
FIG. 1 is a plain view of the invention.
Figure 2:
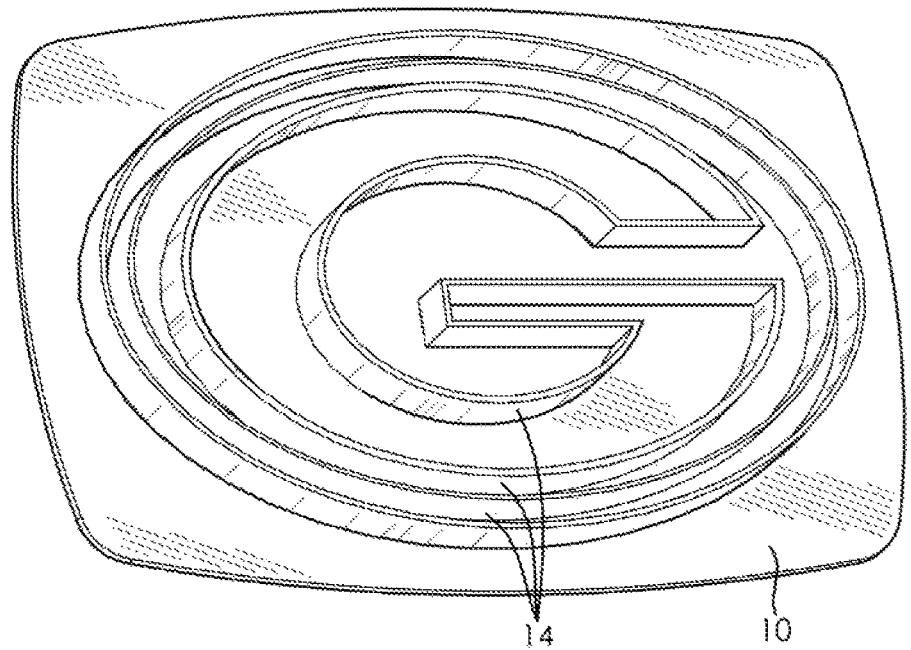
FIG. 2 is a plain view of the surface of the invention.

FIG. 1 is a plain view of the invention. FIG. 1 shows a surface 10 that is placed in the bottom of an aquarium 24. The surface 10 is designed in the Green Bay Packer logo. In FIG. 1 the colored rocks 12 are in place showing the logo. FIG. 2 shows the surface 10 without the colored rocks 12. In FIG. 2 surface 10 has partitions 14. These partitions 14 are designed to make an outline around an area of a single color of the logo. The partitions 14 close sections. In the Green Bay Packer logo the outer partition 18 is yellow. A partition 14 can be a color or can be clear. The inner partition 20 is clear. This inner partition 20 is made in the form of a G. The inner partition 20 only outlines the G. The G is fully enclosed by the inner partition 20. To make the Green Bay logo white stones 24 are placed within the inner partition 20 forming a white G. Green stones 22 are placed around the outside of the inner partition 20 and between the inner parturition 20 and the outer petition 18. Thus creating the Green Bay logo which is a white G on a green background encircled in yellow.

Figure 4:
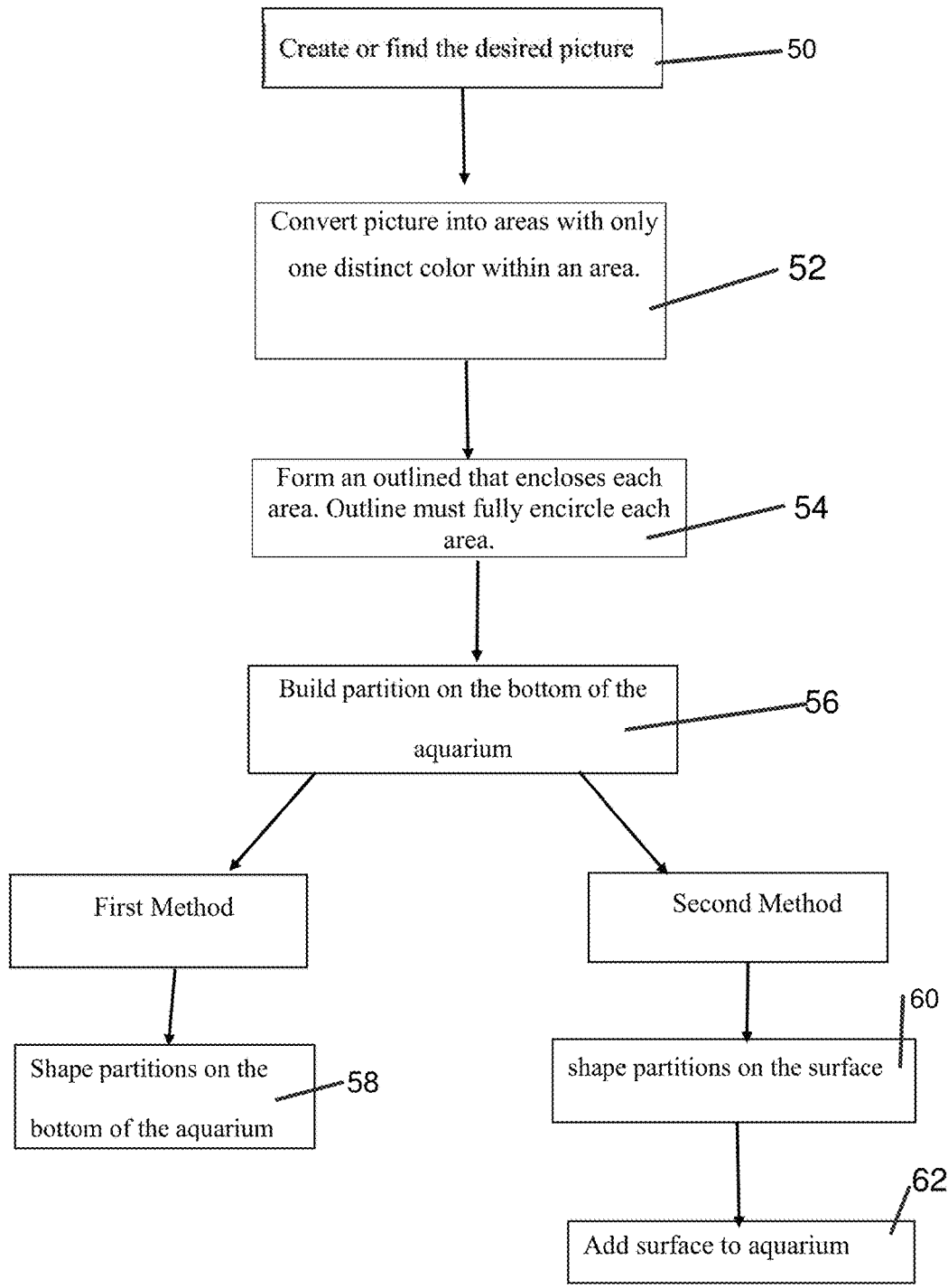
FIG. 4 is a flow chart.

FIG. 4 is a flow chart. FIG. 4 describes how one creates a logo or picture on the bottom of an aquarium 24. The first step 50 is to create or find the desired picture. The second step 52 in FIG. 4 is to take the picture and to convert the picture into areas with only one distinct color within the area. Step 54 is to form an outline that encloses each of these areas within the picture. The outline must completely enclose each area of a single color. Step 56 is to build partition 14 on the bottom of the aquarium 24 that matches the outline. There are two different methods to achieve this step.

The first method Step 58 is to shape partitions 14 on the bottom of the aquarium 24 that match the outline. The partitions 14 can be constructed on the bottom of the aquarium 24 by many methods. This could be done through molding especially injection molding or vacuum forming the bottom of the aquarium 24. In this embodiment the bottom of the aquarium 24 and the partitions 14 would all be molded together. The partitions could also be formed by using pieces of material and affixing them to the bottom of the aquarium 24. In this embodiment the pieces of material would be flexible enough to form a curved surface. A 3-D printing machine could also be used to form the partitions 14. The pattern would be placed by software within the 3-D printing machine, and the 3-D printing machine would print out the partitions on the bottom of the aquarium 24. If a 3-D printing machine is used each aquarium 24 bottom could be individualized. All that would be necessary to change from one designed to another would be to change the software in the 3-D printing machine.

The second method Step 60 is to shape partitions 14 on the surface 10 that match the outline and then place the surface 10 on the bottom or the aquarium 24. The partitions 14 can be constructed on the surface 10 by many methods. This could be done through molding especially injection molding or vacuum forming the surface 10. In this embodiment the surface 10 and the partitions 14 would all be molded together. The partitions 14 could also be formed by using pieces of material and affixing them to the surface 10. In this embodiment the pieces of material would be flexible enough to form a curved surface. A 3-D printing machine could also be used to form the partitions 14. The pattern would be placed by software within the 3-D printing machine, and the 3-D printing machine would print out the partitions 14 on the surface 10. If a 3-D printing machine is used each surface 10 could be individualized. All that would be necessary to change from one designed to another would be to change the software in the 3-D printing machine.

Colors of the partition 14 can conform to the colors of the outline in the picture. The partitions 14 would be formed a sufficient height that many layers of rocks 12 could be placed within the partitions 14. Once all the partitions 14 are constructed colored rocks 12 or colored sand that conform to the colors in the picture are put in placed within the partitions which is step 62. If a surface is used another Step 63 would be placing the surface 10 in the bottom of the aquarium 24.

FIGS. 3, 3A, 3B, and 3C show an aquarium 24 containing the Packer logo 11.

Figure 3:
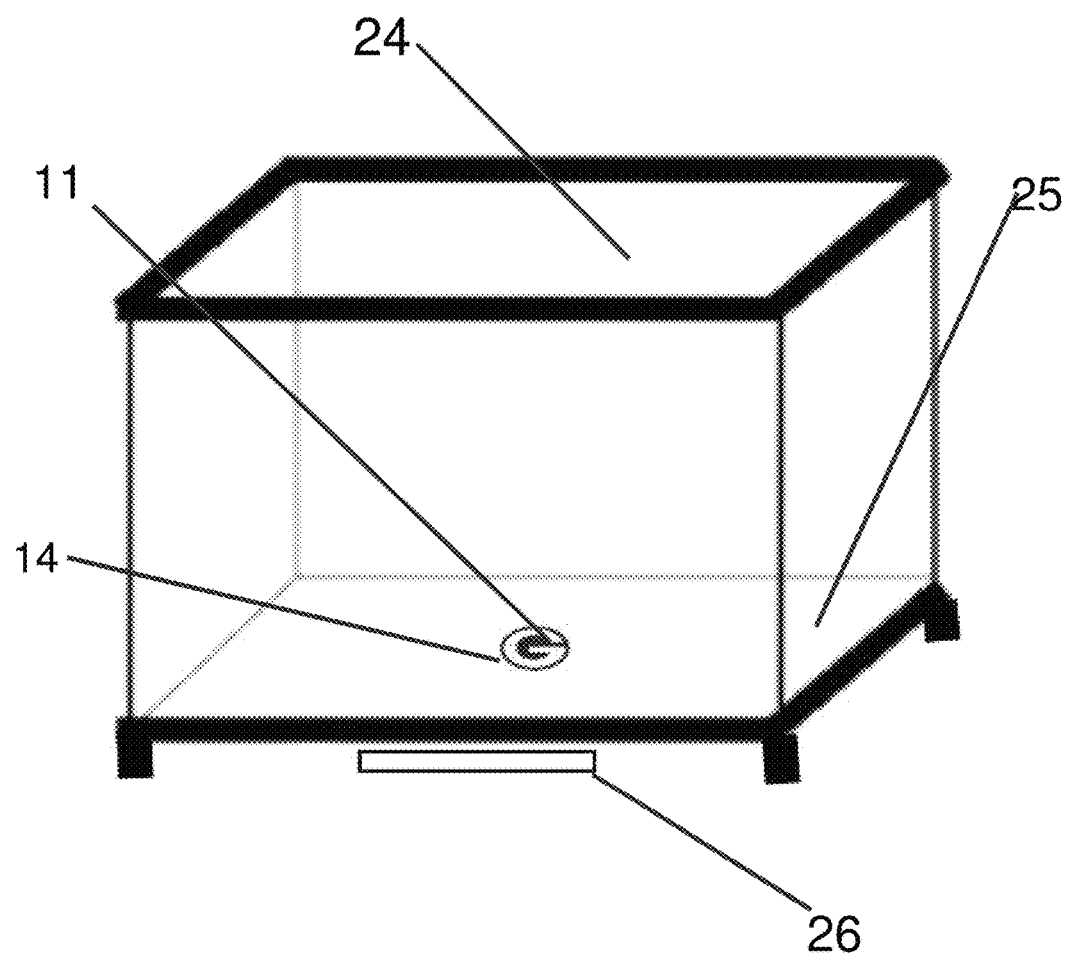
FIG. 3 is a view of an aquarium with the invention on its bottom.

In FIG. 3 the partitions 14 are made out of plastic. The partitions 14 could be made out of any material such as metal, plastic or glass that would withstand weathering by water. In FIG. 3 the aquarium's 24 bottom 25 is made out of clear plastic or glass. It is important for this embodiment that the aquarium's 24 bottom 25 be clear. Underneath the aquarium's 24 bottom 25 is a lamp 26. Lamp 26 could be a florescence, incandescent, or LED. The rocks 12 in this embodiment can also be translucent so that the light will show through them.

Figure 3A:
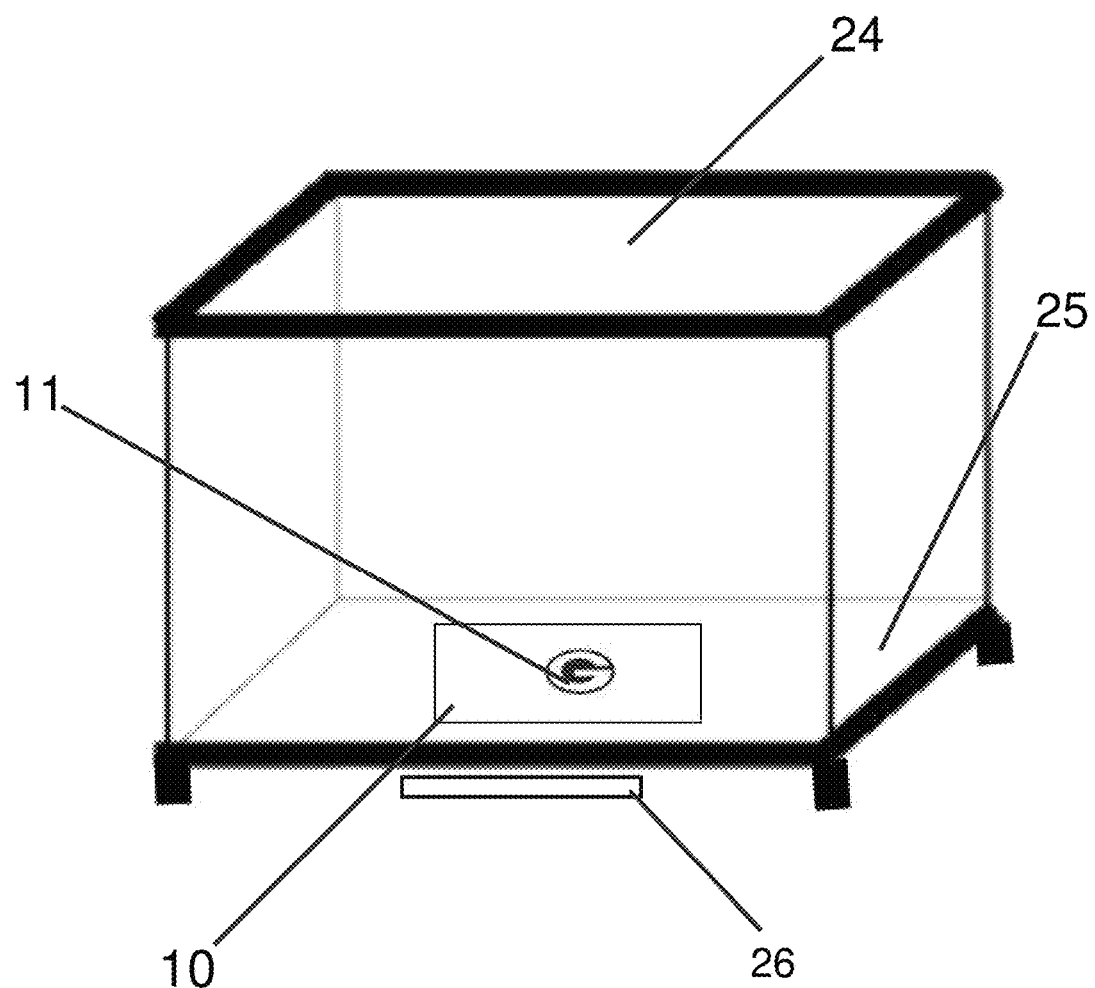
FIG. 3A is a view of an aquarium with another embodiment of the invention on its bottom.

In FIG. 3A both the aquarium's 24 bottom 25 and the surface 10 are made out of clear plastic or glass. It is important for this embodiment that the aquarium's 24 bottom 25 and the surface 10 be clear. Underneath the aquarium's 24 bottom 25 is a lamp 26. The rocks 12 in this embodiment can also be translucent so that the light will show through them.

Figure 3B:
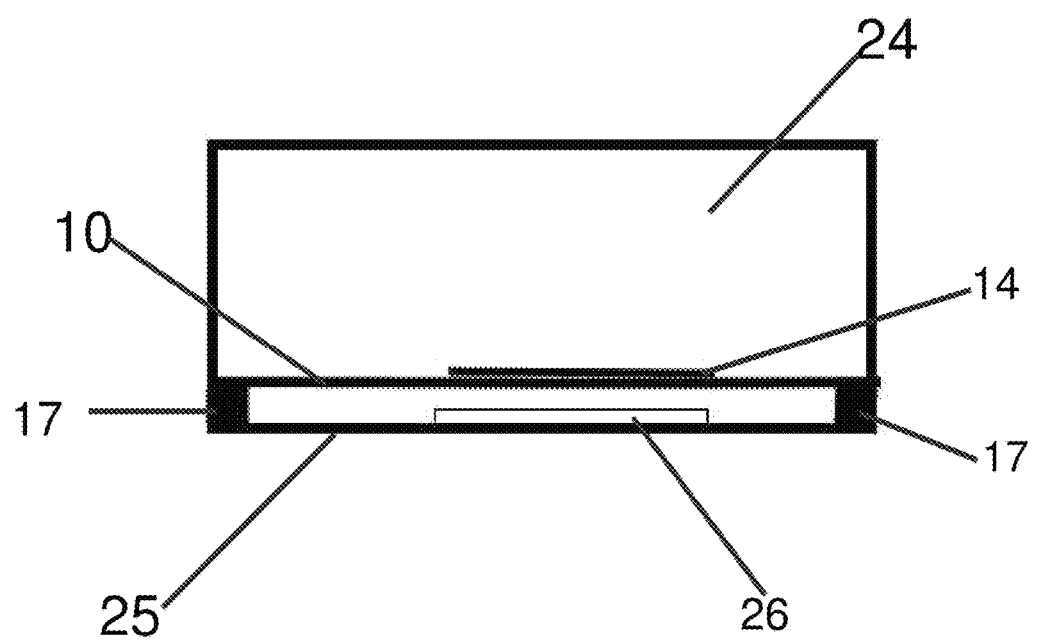
FIG. 3B is a view of an aquarium with a third embodiment of the invention on its bottom.
Figure 3C:
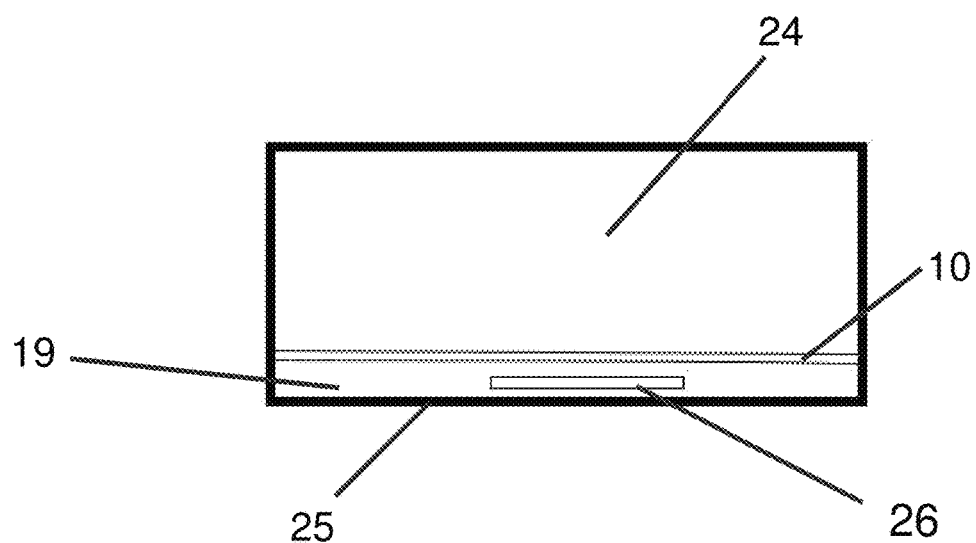
FIG. 3C is a view of an aquarium with a forth embodiment of the invention on its bottom

In FIGS. 3B and 3C the surface 10 is above the bottom of the aquarium 24. Beneath the surface but above the aquarium's 24 bottom 25 is lamp 26. In FIG. 3B surface 10 has legs 17 that keep it above the bottom of aquarium 24. In FIG. 3C below surface 10 is lamp section 19 the contain lamp 26. In FIGS. 3B and 3C lamp 26 is water proof.

Almost any type of picture or logo or picture could be used. The aquarium's 24 bottom 25 can be designed in many ways. As put forth above the inventor has used a Green Bay Packer logo 11. The bottom's 25 design could also be like a football field. In this case it would be green stones 22 with white partitions 14 to look like a football field. On the football field could be placed helmets of the color of the team to be represented. Also bobble heads or bust of players could be used. The aquarium's 24 bottom 25 could also be designed as a baseball or hockey field. In hockey the lines in the field would be portrayed by the partitions 14. For baseball you could use green stones 22 for the grass and brown sand or rocks 12 for the dirt of the infield. The bases would be in white. Here again the players could be represented by bust or bobble heads or just by the team. Many other motifs could be used. For children Sesame Street, Disney characters could be portrayed. The bottom of the aquarium 24 could have a large black area looking like Mickey Mouse with other colors rocks 12 around. The rocks 12 on the bottom could depict Bert and Ernie and a rubber duck as a statue could set on the rocks 12.

The back and sides of the aquarium 24 could also be used. A picture could be placed up on the back and/or sides that enhances the theme for the aquarium 24. Such as with a football field a goalpost could be put on the back. Around the baseball field you could see the outfield fence. The pictures could also be of football, baseball, hockey or basketball players, or Disney or Sesame Street characters, etc.

The aquarium 24 could be set up with a NASCAR vehicle represented in the rocks 12 on the bottom of the aquarium 24. The back of the aquarium 24 could be made to look like a stadium for watching a race.

I claim:

1. A decoration for an aquarium comprising:
   a. a transparent or translucent surface with a top and a bottom that fits on the bottom of an aquarium; and,
   b. partitions on the top of the transparent or translucent surface that form areas; and,
   c. colored stones or sand that can be placed within the areas on the top of the transparent or translucent surface; and,
   d. a lamp that is waterproof under the transparent or translucent surface to shine through the piece of material and said lamp is above the bottom of the aquarium.

2. The decoration for an aquarium as in claim 1 wherein: the partitions are bonded to the transparent or translucent surface.

3. The decoration for an aquarium as in claim 2 wherein: the partitions form an outline of a picture which is created by placing a single color of stone or sand within the area outlined by the partition.

4. The decoration for an aquarium as in claim 1 wherein: the partitions form enclosed areas.

5. The decoration for an aquarium as in claim 1 wherein: the lamp is attached to the bottom of the transparent or translucent surface.

6. The decoration for an aquarium as in claim 1 wherein: the lamp, the transparent or translucent surface, and partitions form a single integral piece.

7. The decoration for an aquarium as in claim 6 wherein: the transparent or translucent surface is molded with the lamp.

8. The decoration for an aquarium as in claim 1 wherein: the transparent or translucent surface has legs and the lamp fits under the transparent or translucent surface and above the bottom of the aquarium in an area created by the legs.

9. The decoration for an aquarium as in claim 1 wherein: the sand or stones are transparent or translucent.

10. The decoration for an aquarium as in claim 1 wherein: the transparent or translucent surface is molded with the partitions.

11. The decoration for an aquarium as in claim 1 wherein:
   the transparent or translucent surface and the partitions are printed with a 3D printer.

12. The decoration for an aquarium as in claim 1 further comprising:
   depictions for the sides of the aquarium that enhance the theme of the decoration.

\* \* \* \* \*